United States Patent

[11] 3,623,544

[72] Inventor Arthur F. McLean
 Ann Arbor, Mich.
[21] Appl. No. 871,255
[22] Filed Nov. 5, 1969
[45] Patented Nov. 30, 1971
[73] Assignee Ford Motor Company
 Dearborn, Mich.
 Original application Aug. 29, 1968, Ser. No. 756,236. Divided and this application Nov. 5, 1969, Ser. No. 871,255

[54] GAS TURBINE HEAT-EXCHANGING SYSTEM USING FLEXIBLE LOCATING MEMBERS FOR TORQUE TRANSMISSION
5 Claims, 6 Drawing Figs.
[52] U.S. Cl.................................................. 165/8,
 64/11 F, 64/27 NM, 74/443, 74/446, 165/10
[51] Int. Cl............................................... F28d 19/02
[50] Field of Search........................................ 165/8, 10;
 74/443, 446; 64/11 F, 27 NM

[56] References Cited
UNITED STATES PATENTS

| | | | |
|---|---|---|---|
| 2,439,454 | 4/1948 | Crafts.......................... | 74/446 X |
| 3,167,115 | 1/1965 | Chute.......................... | 165/7 |
| 3,301,317 | 1/1967 | Weaving et al. ............. | 165/8 |
| 3,363,478 | 1/1968 | Lanning ...................... | 74/446 |
| 3,430,687 | 3/1969 | Wardale...................... | 165/8 |

FOREIGN PATENTS

| | | | |
|---|---|---|---|
| 975,776 | 11/1964 | Great Britain............... | 165/8 |

Primary Examiner—Albert W. Davis, Jr.
Attorneys—John R. Faulkner and Glenn S. Arendsen ABSTRACT: A porous ceramic regenerator core fabricated in the shape of a twelve-sided regular polygon is surrounded by a metal ring gear having gear teeth on its exterior surface. Locating members transmit driving torque from the ring gear to the core while permitting the core to move radially and axially relative to the ring gear. Narrow slots can be cut into the outer edge of the ceramic core to relieve thermally induced stresses.

PATENTED NOV 30 1971 3,623,544

INVENTOR.
ARTHUR F. MCLEAN
BY
ATTORNEYS

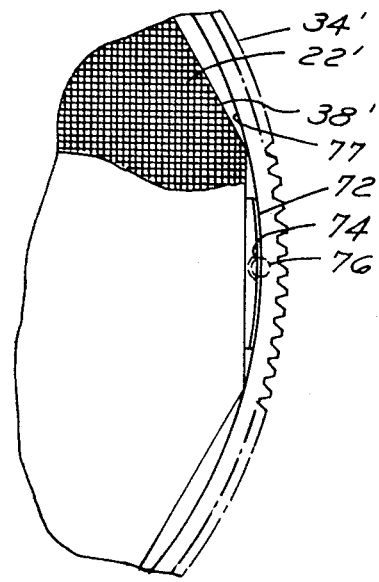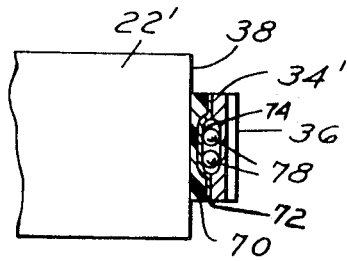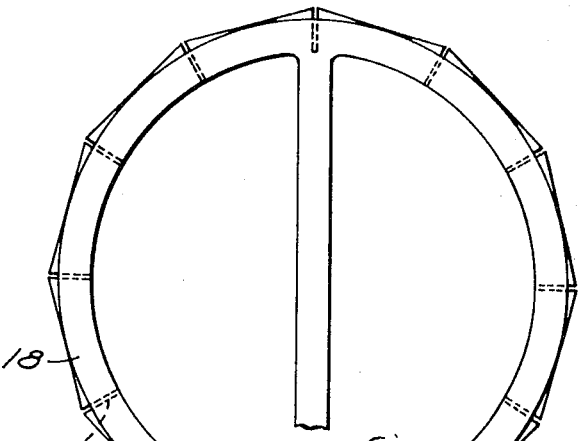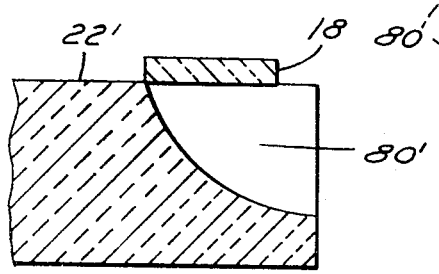

GAS TURBINE HEAT-EXCHANGING SYSTEM USING FLEXIBLE LOCATING MEMBERS FOR TORQUE TRANSMISSION

This is a division of application Ser. No. 756,236, filed Aug. 29, 1968.

SUMMARY OF THE INVENTION

The efficiency of a gas turbine engine increases directly with the temperature of the gases entering the turbine wheel, and extensive research has been directed toward finding new high-temperature materials and fabricating these materials into gas turbine engine components. A portion of this research recently produced a ceramic regenerator capable of surviving for extended periods of time in the higher temperatures and of performing an efficient heat-exchanging function. Metal gears are needed to drive such regenerator cores, however, and the differences in thermal expansion coefficients of the ceramic and the metal have produced considerable difficulties in finding a suitable driving system therefor. Moreover, new sealing systems also were necessary because the previously used metal seals could not survive for useful periods at the temperature involved. This invention provided a heat-exchanging system for a gas turbine engine that uses the ceramic regenerator core to great advantage. The system comprises a disc-shaped ceramic regenerator core having at least an interior portion porous to gases flowing essentially parallel to the core rotational axis. A plurality of flat portions are formed on the exterior surface of the core and an annular driving member is spaced a short distance radially outward from the core. Locating members corresponding numerically to the number of flat portions are positioned between each of the flat portions on the core and the driving member. The locating members are designed to permit slight radial and axial movement between the core and the driving member while transmitting driving torque from the driving member to the core.

The regenerator core can be formed entirely of porous ceramic material with the flat portions machined on its exterior surface. In an alternate construction, the porous ceramic material is surrounded peripherally by a narrow rim of solid ceramic with the flat portions cast or machined on the exterior of the solid rim. Improved stability is achieved by forming a groove in the periphery of the rim and machining the flat portions on the bottom of the groove.

Locating members can be made up of a pad of a high-temperature elastomer having a steel plate with a narrow groove therein bonded to one side. Foamed elastomers having approximately 15–30 percent void space have an excellent combination of shear strength and elasticity and are particularly useful in making up the pads. The elastomer of each pad is placed against one of the flat portions of the core so the groove in the steel plate runs in a direction parallel to the rotational axis of the core. A corresponding groove is formed in the inner surface of the driving member and small balls or rollers are positioned in the grooves during assembly of the driving member to the core. The balls or rollers can move a short distance determined by the length of the groove in a direction parallel to the rotational axis of the core and thereby permit slight axial movement between the core and the driving member. Relative tangential movement is prevented by interference between the balls and the groove sides, which of course transmits driving torque from the driving member to the core. Radial movement between the core and the driving member resulting from thermal expansion differences is absorbed by the elastomer.

Alternatively, flat portions corresponding in number to those on the core can be formed on the interior surface of the driving member and leaf springs then can be used as the locating members. The springs are folded and installed while compressed to exert forces urging the driving member axially away from the core.

A metal ring gear having gear teeth on its exterior surface usually serves as the driving member although friction-type driving systems also can be used. The regenerator core is mounted between a metal cover and a ceramic interior housing that conducts hot gases from the turbine wheel to the hot side of the regenerator. A solid ceramic seal is located between the core and the ceramic interior housing. The engine outer housing forms an annular space surrounding the driving member and a passage conducting relatively cool air from the compressor to the regenerator communicates with the annular space. A metal seal urging the core onto the ceramic seal is positioned in the cooler environment between the cover and the core.

BRIEF DESCRIPTION OF THE DRAWINGS

FIGS. 3 and 4 show an alternate construction in which the flat portions are machined directly on the porous ceramic core and elastomer pad and roller assemblies serve as the locating members. FIGS. 5 and 6 show the use of narrow slots in the edge of the core to relieve thermally induced stresses. FIG. 5 is taken along line 5—5 in FIG. 1 to show the relationship of the ceramic lower seal to the slots. FIG. 6 is a sectional view taken along line 6—6 of the FIG. 5 core showing arcuate stress-relieving slots.

DETAILED DESCRIPTION

Figure 1:
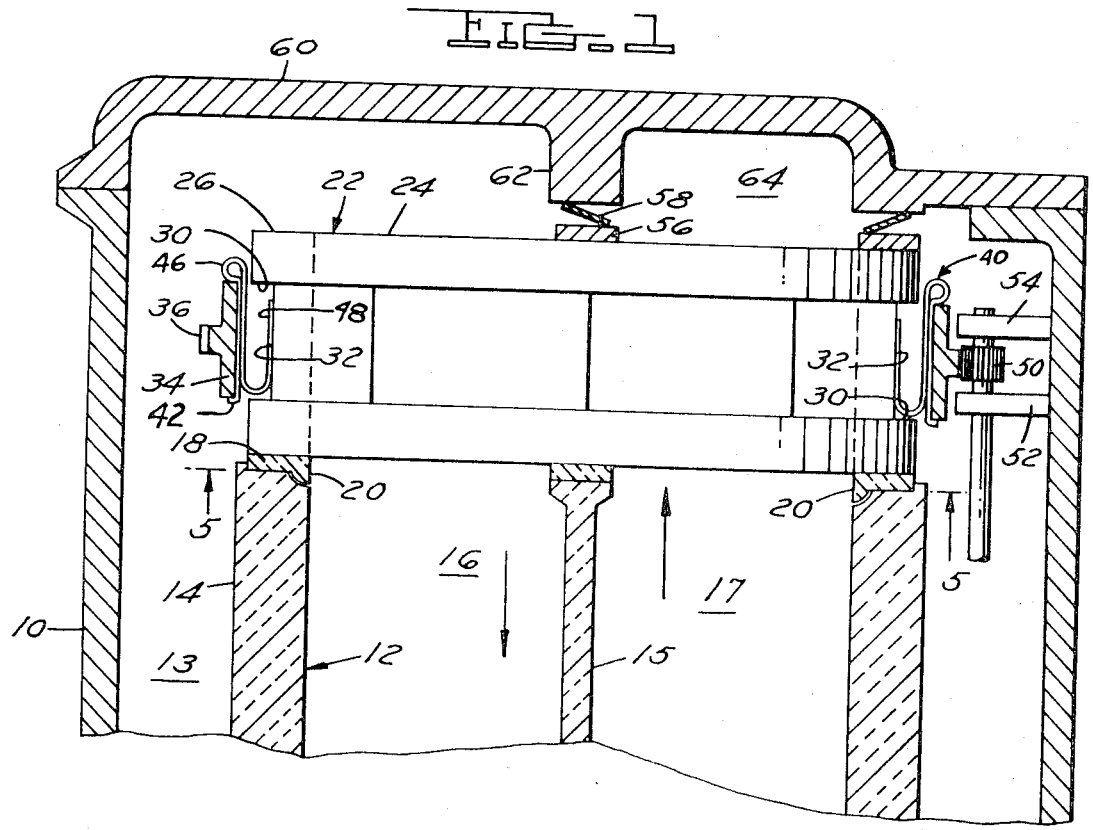
FIG. 1 is a sectional elevation of a portion of a gas turbine engine showing the relationship of a disc-type regenerator core and ring gear to the engine exterior metal housing and interior ceramic housing. The ring gear is spaced from the core by folded leaf springs fitting into a groove on the core exterior.

Referring to FIG. 1, a gas turbine engine containing the system of this invention has an essentially elliptical metal outer housing 10 that is open at the top of the regenerator portion. FIG. 1 is sectioned along the major diameter of the ellipse. A smaller ceramic inner housing 12 is located inside housing 10 and terminates a short distance from the opening thereof. Inner housing 12 comprises an outer cylindrical wall 14 divided diametrically by a wall 15 into two semicircular passages 16 and 17. Wall 14 forms an annular passage 13 between part of its circumference and housing 10. A solid ceramic rubbing seal 18 having the same shape as housing 12 is located on top of housing 12 where it is restrained from circular movement by fitting ribs 20 on the underside of seal 18 into corresponding grooves on the top of housing 12. Seal 18 is made of a ceramic having good wearing properties such as nickel-oxide calcium-fluoride combination and can be formed integrally with inner housing 12.

Figure 2:
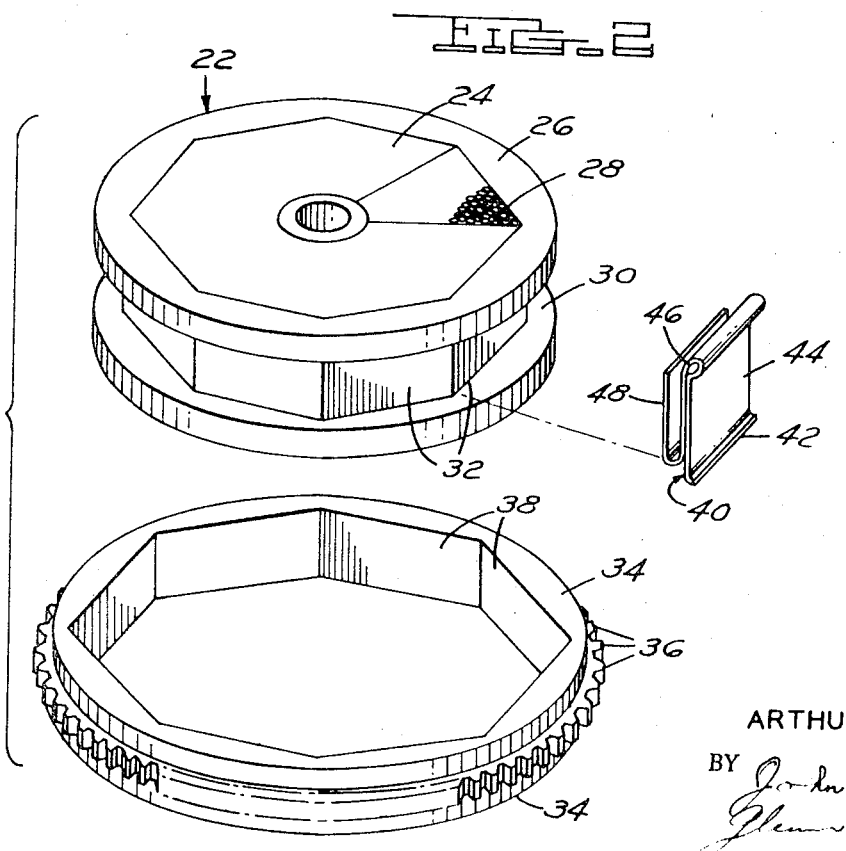
FIG. 2 is an exploded perspective view of the regenerator core of FIG. 1 showing the porous interior and solid rim core construction.

A ceramic regenerator core 22 is mounted rotatably on top of seal 18. As shown in FIG. 2, core 22 comprises a porous interior portion 24 surrounded by a solid rim 26. Porous portion 24 can be made by any of a variety of methods such as winding sheets of corrugated and flat ceramic into a disc shape or dipping a plurality of absorbent straws in a ceramic slurry and firing the slurry into a structural unit. The fired ceramic can be made in the shape of wedges 28 that are assembled into rim 26 so rim 26 exerts a compressive residual stress on the wedges. A groove 30 is formed in the exterior surface of rim 26 and 12 flat portions 32 of equal length are formed at the bottom of groove 30. Each flat portion intersects its adjacent flat portions so the portion of the rim at the bottom of groove 30 is shaped like a regular polygon.

A metal ring gear 34 fits around core 22 and is spaced a short distance radially therefrom. Gear 34 has gear teeth 36 formed on its exterior surface and 12 flat portions 38 on its interior surface. Twelve leaf springs, one of which is indicated by numeral 40, are formed into locating members by bending up one edge 42, making a flat portion 44 equaling the width of flat portion 38 of the ring gear, folding the spring material upwardly and back behind itself as at 46 to form a portion contacting the other side of a flat portion 38, and curving the remaining part of the spring into a U-shaped section 48. The width of springs 40 approximately equals the length of flat portions 38. Gear 34 is assembled to core 22 by placing flat portion 44 of each spring against flat portion 38 of the gear and compressing the U-shaped section 48 into groove 30 so the lower leg of the U section rests on flat portion 32. As shown in FIG. 1, the lower leg of U section 48 is slightly shorter than the width of groove 30.

Two bosses 52 and 54 project inwardly from housing 10 to support a pinion gear 50 that is driven by the compressor turbine wheel (not shown). Gear 50 meshes with ring gear 34 when the assembly of core 22, gear 34, and springs 40 is located on top of inner housing 12. A D-shaped seal 56 is located above wall 15 and the semicircular portion of housing 12 forming passage 17 with the bottom of seal 56 in rubbing contact with core 22. Seal 56 can be made of metal having a wearing surface on its lower side suitable for use on ceramics; a typical seal is described in the application of Whalen et al. Ser. No 613,920, filed Feb. 3, 1967, the entire disclosure of which is incorporated herein. A metal foil seal 58 is welded to the top inner edge of seal 56.

A metal cap 60 covers the open portion of outer housing 10 and is fastened thereto by threaded means (not shown). Cap 60 has a downwardly projecting ridge 62 aligned with diametrical wall 15 of the inner housing that bears on the straight portion of foil seal 58. A portion of the circumference of cap 60 bears on the semicircular portion of foil seal 58. Foil seal 58 is deflected by cap 60 and acts as a spring urging core 22 downward onto seal 18. Rotation of seal 56 is restrained by projecting fingers (not shown) on cap 60 or housing 10.

During engine operation, relatively cool air from the compressor flows up passage 13 and is turned downward by cap 60 into the porous interior portion 24 of rotating regenerator core 22. The air passes through porous portion 24 and continues downward through passage 16 to the engine combustion chamber (not shown). Hot combustion gases from the combustion chamber pass initially through the turbine wheels (not shown) and then flow upward through passage 17, the portion of core 22 above passage 17, and into space 64 which exhausts the gases to the atmosphere.

The temperature of the gases in passage 17 is extremely high and can exceed 1,800° F. A considerable portion of this heat is transferred by the rotating regenerator core to the air passing through the sector of the core above passage 16. Gas temperatures in space 64 are considerably less than the temperature in passage 17 so metal seals 56 and 58 survive for useful periods. Relatively cool air from passage 13 surrounds the exterior periphery of core 22 so ring gear 34, locating members 40, and pinion gear 50 operate in a relatively cool environment.

Springs 40 deflect to absorb radial differences in thermal expansion of the core 22 and ring gear 34. In addition, the lower leg of U section 48 slides axially relative to core 22 to accommodate axial differences in thermal expansion and distortion. Flat portions 32 and 38 combine with springs 40 to prevent tangential movement between the ring gear and the core; springs 40 thus transmit rotational torque from ring gear 34 to core 22.

In the less expensive core and ring gear construction shown in FIGS. 3 and 4, the core 22' is fabricated entirely of the porous ceramic construction. Flat portions 38' are machined on the exterior periphery of core 22 and extend across the entire width of the core. Each flat portion intersects its adjacent flat portions to form the core into a regular polygon.

A pad 70 of a high-temperature elastomer such as Dow-Corning Silastic 69 has a steel plate 72 bonded to one side thereof. Silastic 69 is a foamed silicone rubber having a void volume of about 20 percent. Plate 72 has a semicircular groove 74 formed therein and pad 70 is placed against a flat portion 38' so groove 74 runs parallel to the rotational axis of core 22'. Corresponding semicircular grooves are formed on the circular inner surface 77 of ring gear 34'. It is not necessary to form flat portions on inner surface 77 in the construction of FIGS. 3 and 4, which reduces ring gear cost. Steel balls 78 are placed into corresponding grooves 74 and 76 as the ring gear is assembled to the core.

The core and ring gear assembly is located in the engine housing as described above. Since the elastomer pad 70 operates in the relatively cool environment provided by air in passage 13, the elastomer survives for useful periods even though it is only a short distance from the portion of the regenerator above passage 17 which approaches and can exceed 1,800° F. Deflection of the pad accommodates radial differences in thermal expansion and pad deflection combined with movement of balls 78 accommodates thermal distortion. Balls 78 bear on the sides of grooves 74 and 76 to transmit tangential driving torque from ring gear 34' to core 22'.

Since the exterior periphery of cores 22 and 22' operate in a relatively cool environment while the interior portion of the core passing above passage 17 becomes extremely hot, the edge portion of the core itself can contain high thermally induced stresses. Such stresses can be relieved at least partially by machining short diametrical slots 80 into the corners between flat portion 38' as shown in FIG. 5. Slots 80 do not extend inward beyond the inner edge of seal 18 and generally need to be only about 0.010 inch wide. If wider slots are desired, the slots can be filled with a flexible cement to reduce air leakage. The slots can extend completely through the edge of the regenerator core or can have the arcuate shape shown in FIG. 6 for slot 80'.

Thus this invention provides a heat-exchanging system for a gas turbine engine capable of operating in relatively high-temperature combustion gases for useful periods of time. The locating members serve also as torque-transmitting members and permit relative movement in two directions of the core and ring gear to prevent large thermally induced stresses. In addition, metal components are used wherever possible to attain high-component life and reduce material costs.

What is claimed is:

1. A heat-exchanging system for a gas turbine engine comprising
    a regenerator core mounted rotatably in said engine, said core having a ceramic interior portion porous to gases flowing essentially parallel to the core rotational axis, the exterior surface of said core having a plurality of flat portions thereon,
    an annular driving means fitting loosely around said core, and
    a plurality of locating members corresponding numerically to said plurality of flat portions, one of said locating members being positioned between the flat portions of said core and said driving means, said locating members permitting slight relative radial and axial movement while preventing tangential movement between said core and said driving means, each locating member comprising a pad of elastomeric material having a metal plate bonded to one side, said pad being located against the flat portions on said core with the metal plate on the radial exterior of the pad, said metal plate having a groove parallel to the rotational axis of the core, the inner surface of said driving means having corresponding grooves therein, and circular metal members located in said grooves, said metal members bearing against the edges of the grooves to transmit driving torque from the driving means to the core.

2. The system of claim 1 in which the circular metal members are steel balls.

3. The system of claim 2 in which the elastomeric material has a foamed structure containing about 15–30 volume-percent of voids.

4. The system of claim 3 in which each flat portion of the core intersects its adjacent flat portions to form the core into a regular polygon.

5. The system of claim 4 in which the core has narrow slots at the corners of the flat portions, said slots being parallel to the core rotational axis.

* * * * *